United States Patent
Tripathi et al.

(10) Patent No.: US 6,968,456 B1
(45) Date of Patent: Nov. 22, 2005

(54) METHOD AND SYSTEM FOR PROVIDING A TAMPER-PROOF STORAGE OF AN AUDIT TRAIL IN A DATABASE

(75) Inventors: Aridaman Tripathi, Landour (IN); Madhusudhana H. S. Murthy, Karnataka (IN)

(73) Assignee: Novell, Inc., Provo, UT (US)

( * ) Notice: Subject to any disclaimer, the term of this patent is extended or adjusted under 35 U.S.C. 154(b) by 920 days.

(21) Appl. No.: 09/634,445

(22) Filed: Aug. 8, 2000

(51) Int. Cl.[7] ........................... H04L 9/00; G06F 12/16
(52) U.S. Cl. ........................ 713/185; 707/9; 707/202
(58) Field of Search .......................... 713/177, 178, 713/185, 193, 174; 707/202, 9

(56) References Cited

U.S. PATENT DOCUMENTS 5,995,624 A * 11/1999 Fielder et al. ............... 713/169
6,122,630 A * 9/2000 Strickler et al. ............. 707/8

* cited by examiner

Primary Examiner—Gilberto Barrón, Jr.
Assistant Examiner—Grigory Gurshman
(74) Attorney, Agent, or Firm—Haynes and Boone, LLP

(57) ABSTRACT

A method and system is provided for a tamper-proof storage of one or more records of an audit trail in a database. Since the integrity of the database records may be vulnerable to actions taken by a user such as a privileged database administrator, a mechanism is provided to efficiently detect any changes made by him to the database records. The method creates one or more authentication tokens, and generates one or more validation tokens from the authentication tokens through a combination of a hashing process and an encryption process. Once the validation tokens are created, they are further integrated into the records in the database. The authentication tokens are written to a secured information storage in a predetermined format by a writing machine inaccessible by the user but accessible by the auditor. When an authorized person such as an independent auditor who needs to check the integrity of the records, he can detect a tampering of the records by comparing a validation token computed from the stored validation token with the validation token integrated in the record.

17 Claims, 5 Drawing Sheets

METHOD AND SYSTEM FOR PROVIDING A TAMPER-PROOF STORAGE OF AN AUDIT TRAIL IN A DATABASE

BACKGROUND OF THE INVENTION

The present invention relates generally to computer software, and more particularly, to a system and method for storing data in a tamper proof storage.

In today's computer network environment, large volumes of data are customarily stored and used by various software applications. Data management has become an essential task for many data intensive industries. A smooth business operation depends both on the efficiency and security of the use of the stored data. From the perspective of data management, a database administrator (DB A) is powerful in that he usually has full access to the entire database and all contents stored therein. He can read, write and modify any data stored in the database. In a normal situation, the DBA is endowed with the highest level of trust because of his enormous responsibility. In certain cases, it is desirable to store data in a database in a secure way such that even a privileged user like the DBA should not be able to modify records without detection. For example, it is very important to protect a monotonically increasing audit trail which records actions taken by a user along with his identity against modifications. No one should be able to modify this trail, thus an independent auditor can trace any user's, even the DBA's, actions relating to the database, whereby the integrity and the security of the database are greatly enhanced.

The normal practice consists of reading an audit trail data in a database directly through SQL or JDBC or any such standard client program. Several conventional methods are used for protecting the integrity of the audit trail in a database system. For example, the entire audit trail can be encrypted. Although this encryption prevents access to the trail by the DBA, it does not prevent him from deleting certain records without being detected. Also it hinders the normal practice of reading the trail by users of the database.

As an alternative solution, the audit trail can be validated by a signing process. The signing process corresponds to a digital signature operation which is well known in the industry. This signing process for generating a signature involves taking a message of any length, forming an "imprint" of the message to a fixed length by hashing, and mathematically transforming the hash using cryptographic techniques. While the signature can be generated only by a signer, any other user can verify the generated signature. If a trail for which the signature is attached to has been tampered with, the verifier cannot successfully validate the digital signature. The operations of generating and verifying the signature are computationally expensive because they involve large number churning operations which require significant computer processor time. Moreover, the signing process is directed to the entire trail, not a specific record in it. Under a typical scenario, after all the existing records have been collated, a signature is then generated for the entire trail, and the resulting signature is put in a secure place. Therefore, every time a new record is added to the database, the audit trail is signed again. This method has a heavy computational overhead as the entire audit trail needs to be accessed and signed every time a record is added.

In another alternative solution, the records can be validated by requiring a signature of each record. This method validates the individual records but still fails to prevent the DBA from deleting records without detection.

What is needed is an efficient method and system for keeping a secure database system so that any modifications of the audit trail in a database system by any user including the privileged user like the DBA would be detectable.

SUMMARY OF THE INVENTION

A method and system is provided for a tamper-proof storage of an audit trail in a database having one or more records. Since the integrity of the audit trail may be vulnerable to actions taken by a user such as a privileged database administrator, a mechanism is provided for an authorized person such as an auditor to efficiently detect any changes made by the user to the records in the audit trail.

In one example of the present invention, an auditor creates the initial authentication token from a preliminary authentication token, a Pseudo Random Number and a Timestamp. He also adds a null record as the first record to the audit trail. He computes the initial validation token and passes it along with the initial authentication token to a writing machine. He also stores the preliminary authentication token, the Pseudo Random Number and the Timestamp in a secured information storage. One or more authentication tokens and one or more validation tokens are generated through a combination of a hashing process and an encryption process. The newly generated validation token and authentication token are derived from other validation tokens and authentication tokens generated before. Once the validation tokens are created, they are further integrated into the records in the audit trail. The authentication tokens are written to secured information storage in a predetermined format by the writing machine. This secured information storage is inaccessible to the user but accessible for reading by the auditor.

When the independent auditor needs to check the integrity of a record, since the initial tokens and mechanisms for the hashing process and encryption processes are known to him, he can detect a tampering of the records by comparing a validation token computed from the stored authentication token with the validation token integrated in the record.

Various benefits are achieved over conventional approaches. For instance, the security of the entire trail in a database is strengthened, while normal database queries are not hindered. Further, any actions taken against the records in the trail can be detected without involving a computationally expensive process.

DESCRIPTION OF THE PREFERRED EMBODIMENT

While it is not an objective of the present invention to prevent the database administrator (DBA) from accessing the database under his control or hinder his daily work in any way, the present invention intends to provide a security system for improving the reliability of the audit trail in a database by assuring that any modification or deletion of the records in the trail can be detected by an independent auditor.

Figure 1:
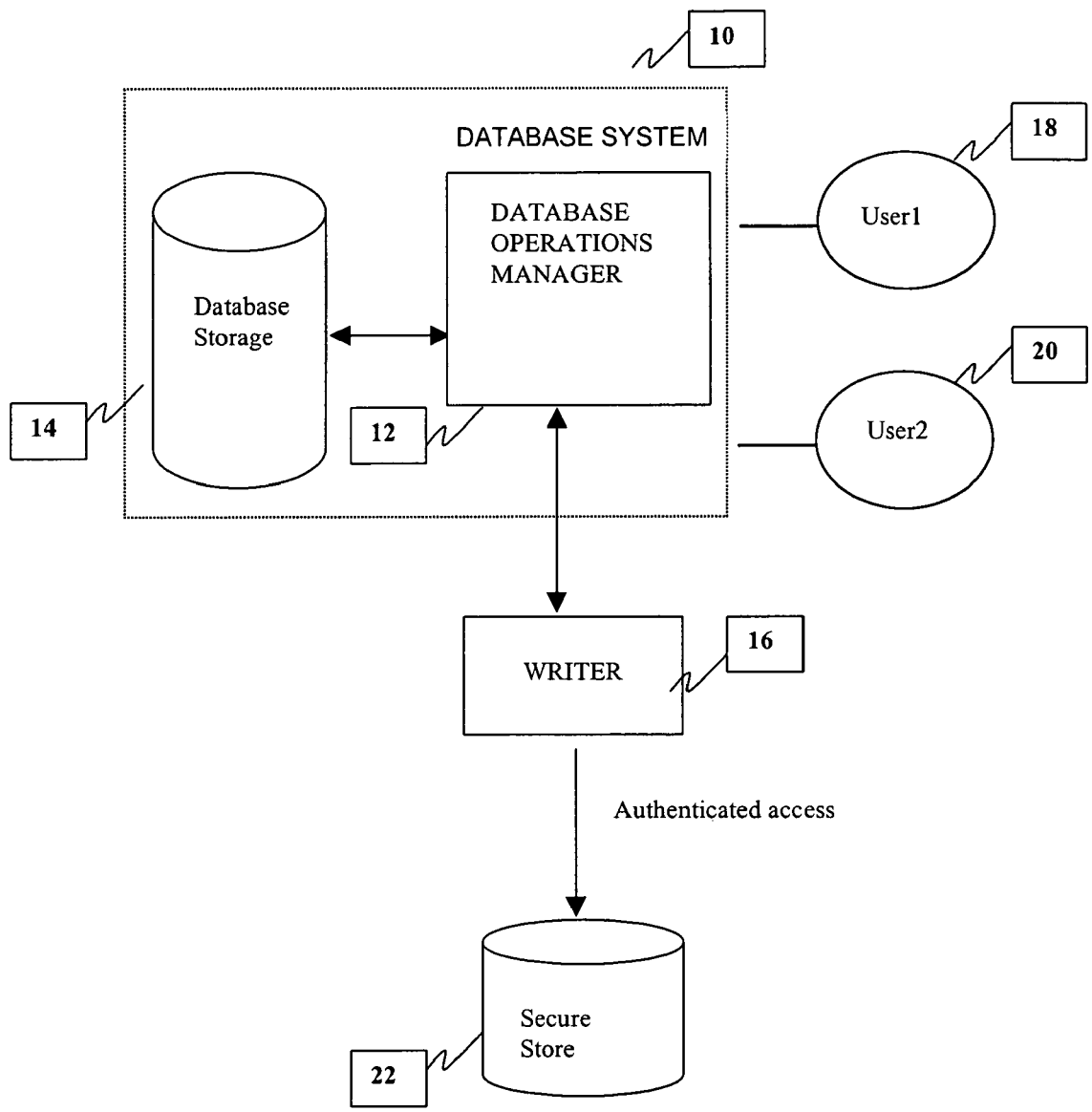
FIG. 1 illustrates a simplified graphical representation of a tamper proof database system.

Referring now to FIG. 1, a simplified tamper proof database system (DB) 10 is shown. The DB 10 contains a main database operations manager (DBOM) 12 and database storage 14. The Secure Store (SS) 22 stores secured information and performs access control based on a user's identity. The SS 22 is essentially a database containing information about network users, network devices and other resources of a network. It helps to manage users, the network resources, and information on the network by providing an administrator/operation manager which has a precise view of network resources and services at any instant of the network operation. In some examples of the present invention, the SS 22 can be a software module, a hardware component, or a combination of both software and hardware components. The SS 22 is also a secured information storage for storing sensitive information in a confidential form. The SS 22 stores information for all entities in a computer network environment, the entities being users, computer hardware devices, or software modules, etc. Every entity is entitled to an exclusive access to a partitioned area in the SS 22. For example, a user is only given access to his related part of the SS 22 if he is authenticated by password or through other authentication methods. The SS 22 then provides information, applications and communications accesses to the users after a successful authentication process. Connected to or contained in the DBOM 12 is a software engine or server that writes data to the database storage 14 or the SS 22. It is heretofore referred to as a writing machine or a Writer 16. The Writer 16 is decoupled from the DB 10 and is not under the control of the DBA. The entire DB 10 interacts with users such as user 1 (numeral 18) and user 2 (numeral 20) based on predetermined access conditions. A typical database system such as one provided by Oracle Corporation can be used as the DB 10 in the present invention. In some cases, the SS 22 can be a Novell Directory Services system (NDS). The Writer 16 can be a network loadable module (NLM) running on a software platform such as Novell's NetWare. The network loadable modules are program modules that perform specific tasks. For example, specific program modules can be written to implement the functionality of a Writer.

In order to implement various examples of the present invention, one common process involved is an encryption process. This process is to encrypt a plain readable message through mathematical transformation so that it is no longer readily decipherable. The transformed message after the encryption process is usually referred to as a ciphered message. The transformation is typically facilitated by using a key called encryption key. This key has to be shared between communicating parties. The sender encrypts the message and sends the ciphered message to the receiver. The receiver performs a reverse-transformation process on the ciphered message to obtain the original plain message based on shared encryption key. Hence, the security of the encryption algorithm is primarily measured by key length. By increasing the key length, the difficulty level to break the encryption algorithm is increased, and the ciphered message is more secure in transmission.

Another common process used by various examples of the present invention is called a hashing process (or a "hash" in short). A hash is a process of transforming a message of any length into a fixed length output message. The output message is called a digest. By definition, a hashing process maps a message of arbitrary length into a digest of a predetermined length. A secure hashing algorithm is designed so that it is computationally unfeasible to determine an input message from its corresponding output digest. Although there are significant number of hashing algorithms known in the art, some well-known hashing algorithms are MD4, MD5, and Secure Hashing Algorithm (SHA).

For the purpose of explaining examples of the present invention, some other technical terms are defined summarily below:

$A_i$—$i_{th}$ Authentication token.
$R_i$—$i_{th}$ Record.
$D_i$—String formed by concatenating fields of the $i_{th}$ Record.
$V_i$—Validation token for the $i_{th}$ Record.
$H(x)$—A secure hash of the string x.
$E_k\{x\}$—Encrypt x with key k.
$x+y$—Concatenation of strings x and y.

In one example of the present invention, an audit trail is carefully created and maintained. In essence, the audit trail is a database system log used for security purposes. The audit trail is normally used for keeping track of operations applied to any information processing system in general, the database in particular, along with user identity. Since a user is granted access to the database after an authentication process, the identity of the user is known to the database, the audit trail thus can record "who has done what" to the database.

The audit trail also includes validation tokens computed by the Writer in order to detect any tampering of the audit trail. In general, a validation token is a field in a record of the audit trail. While an original record is initially stored to the audit trail, it is written along with the validation token. As it will be discussed later with more details, in one example of the present invention, a mathematical representation for an algorithm to generate the validation token can be represented by the following equations:

$$V_i = H(A_i + E_{Ai}\{D_i\}),$$

wherein $A_i$ is referred to as an authentication token. A series of authentication tokens can be generated by using an initial authentication token and various validation tokens. Mathematically, the authentication token bears the relationship with a validation token and a previous authentication token as follows:

$$A_{i+1} = H(V_i + A_i).$$

With the validation tokens created for every action done to the database, both $V_i$ and $R_i$ are stored in the DB 10. The authentication tokens are stored in the SS 22, but after $A_{i+1}$ is stored in the SS 22, the previous value for the authentication token ($A_i$) is deleted. Furthermore, only the Writer has read and write rights and an independent auditor has reading rights to $A_{i+1}$.

Figure 2:
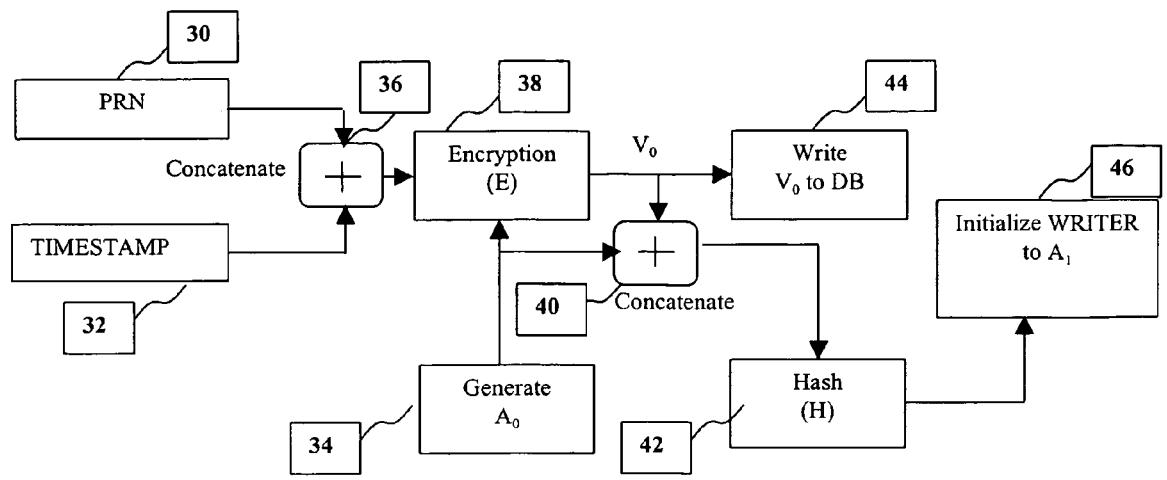
FIG. 2 illustrates a flow diagram for processes involved in initializing an audit trial in a database according to one example of the present invention.

FIG. 2 illustrates the processes involved in initializing an audit trial for a database by an auditor. The auditor starts the process from obtaining a Pseudo Random Number (PRN) 30 and a reliable Timestamp 32, which represents a particular time instant. On the other hand, the auditor also generates, in process 34, a preliminary authentication token $A_0$. The PRN 30 is a secure PRN that can work as a key for some symmetric encryption algorithm. The preliminary authentication token $A_0$ is stored immediately in the SS 22 and only the auditor has access to it. The PRN 30 and the Timestamp 32 are then concatenated in process 36, and fed into an encryption process 38 with $A_0$ as the encryption key. The output of the encryption process is an initial validation token $V_0$. Hence, the mathematical representation for generating the initial validation token $V_0$ is as follows:

$$V_0 = E_{A0}\{\text{Timestamp} + PRN\}.$$

The initial validation token $V_0$ is further concatenated with the preliminary authentication token $A_0$ (in process 40) and passed through a Hash transformation process 42 to obtain the initial authentication token $A_1$. The initial validation token $V_0$ is written to the database in process 44 and $A_1$ is then used to initialize the Writer in process 46. The initial authentication token thus generated is stored in the SS 22 as the current authentication token and is used for writing the audit trail. The preliminary authentication token, Timestamp 32 and PRN 30 are also stored in the SS 22 with only the auditor having the access to them. In a typical case, the auditor usually stores the first (or the initial) record $R_0$ in the database as the beginning of the audit trail. The first record is usually a null record with all its fields empty. The initial validation token is then integrated into the initial record of the audit trail.

Figure 3:
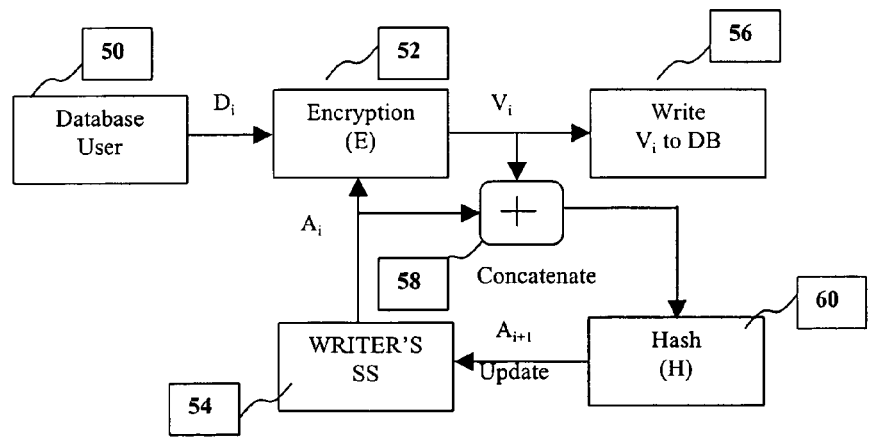
FIG. 3 illustrates a flow diagram containing processes involved for updating the audit trail according to one example of the present invention.

Referring now to FIG. 3, it illustrates a flow diagram containing processes involved for updating the audit trial according to one example of the present invention. A database user 50 feeds $D_i$, which is the data of record $R_i$, to an encryption process 52 using an available current authentication token $A_i$ read from the Writer's SS 54, which is a part of the SS 22 in FIG. 1. The encryption process 52 generates a validation token $V_i$ which is further written to the record of the audit trail in process 56. In addition, the newly computed $V_i$ and the then current authentication token $A_i$ are concatenated (in process 58) and fed into a hash process 60 for computing the next authentication token $A_{i+1}$ which, once generated, overwrites $A_i$ in the SS 54 by the Writer. Consequently, $A_i$ is irrevocably deleted from the SS 54, and the value of the current authentication token is updated by $A_{i+1}$. By running the processes as described with respect to FIG. 3 repeatedly, a series of validation tokens and authentication tokens are created for accessed records of the audit trail, and the audit trail is maintained or expanded whenever an action is taken relating to the database.

Figure 4:
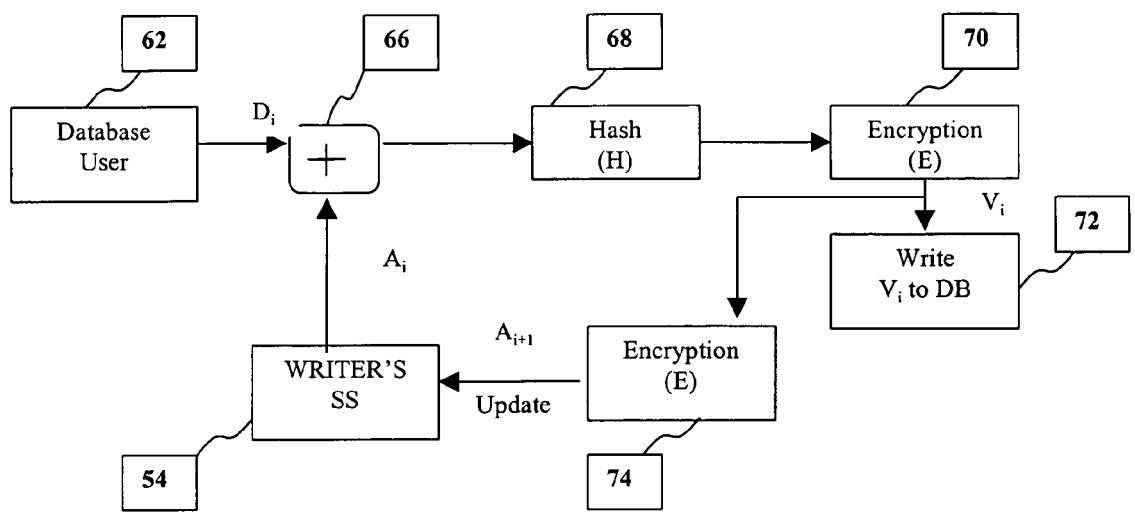
FIG. 4 illustrates a flow diagram containing processes involved for updating the audit trail according to another example of the present invention.

Referring now to FIG. 4, it illustrates a flow diagram containing processes involved for updating the audit trial according to another example of the present invention. In this example, the encryption process is invoked after the completion of a hash. For instance, after the user of the database provides $D_i$ (in process 62) and obtains $A_i$ from the SS 54, they are first concatenated in process 66. The resultant value is fed to a hashing process 68 first, and further through an encryption process 70 to generate a validation token $V_i$. The $V_i$ is written to the DB 10 in process 72, but also fed through another encryption process 74 in order to generate $A_{i+1}$ to replace the existing $A_i$ in the SS 54.

Figure 5:
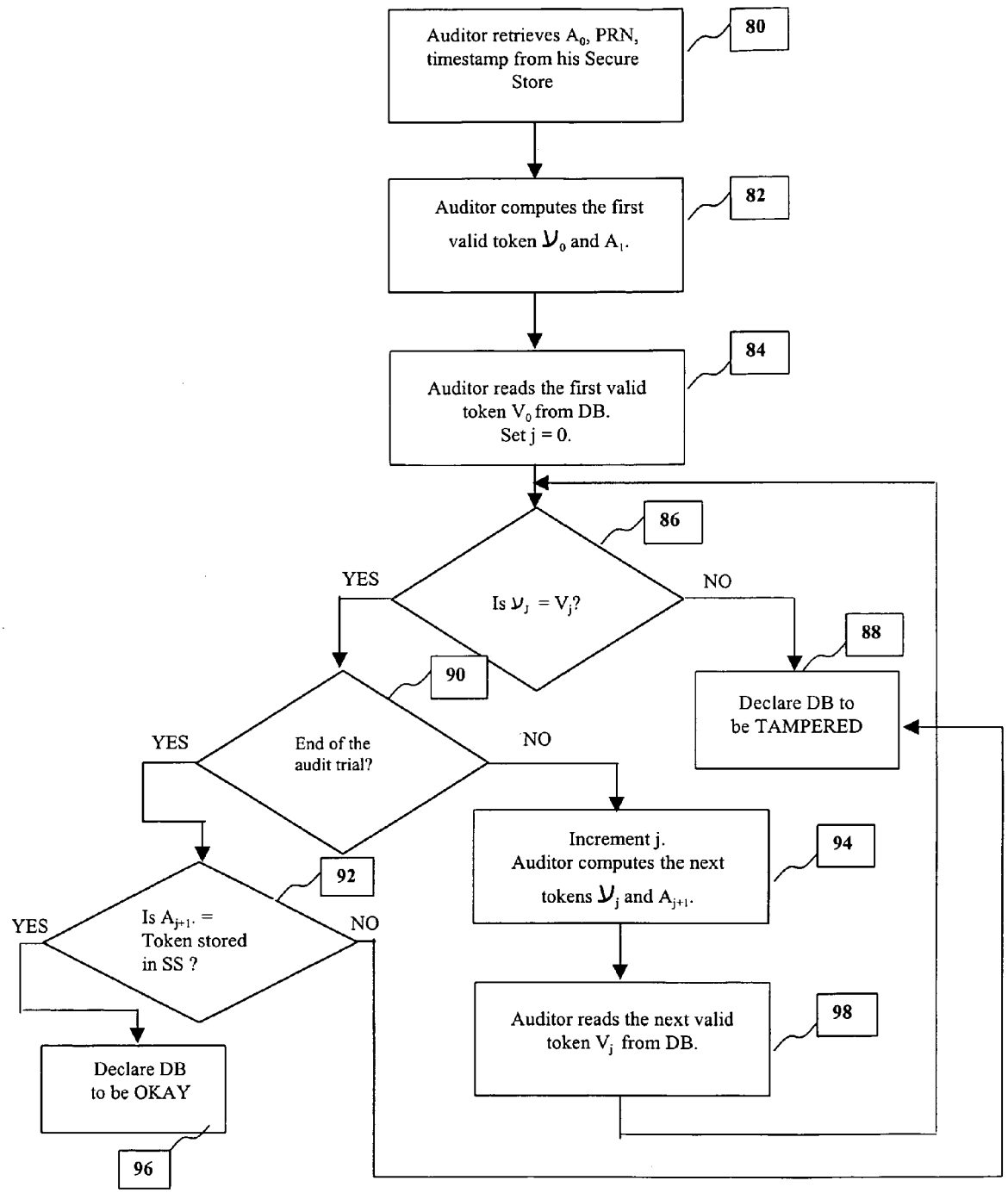
FIG. 5 illustrates a flow diagram for a validation process according to one example of the present invention.

Referring now to FIG. 5, it is a flow diagram for a validation process according to one example of the present invention. Once the audit trail is created, it can be validated at any time. For every record, its validation token and authentication token are generated by using the algorithm described above. Once the audit trail is thus written and maintained periodically with respect to actions taken to the DB 10, it can be used or validated by the auditor to detect any tampering of the audit trail. In general, the trail is validated from the first record and downwards through all other records. When the auditor is to conduct a validation process, in process 80, the first authentication token $A_0$, the Timestamp for $A_0$, and the PRN as stored are extracted from the SS 22 (since only the auditor has privileges to do so). In process 82, the auditor computes the first validation token $V_0$ (the "Computed $V_0$") and the corresponding authentication token $A_1$ (the "Computed $A_1$") by using the retrieved PRN, Timestamp, and the stored first authentication token $A_0$. Subsequently in process 84, the auditor reads the first validation token $V_0$ as stored in the DB (the "Stored $V_0$") and set a counter "j" to zero. The counter "j" may indicate the number of records in the audit trail.

Once the newly Computed and Stored $V_0$ are obtained, they are compared in process 86. If there is any mismatch between them, the corresponding record in the audit trail must have been tampered with. Then, it is immediately reported in process 88. If the Computed and Stored $V_0$ are identical, the counter "j" is further checked to see whether the end of the audit trail has been reached in process 90. If the end of the audit trail has not been reached yet, the counter "j" is incremented in process 94, and the next round authentication token $A_{j+1}$ and validation token $V_j$ are further computed. Immediately following process 94, the auditor retrieves the next stored validation token $V_j$ from the DB 10 in process 98, and process 86 is again initiated to do the comparison. If the end of audit trail is reached in process 90, process 92 checks whether the authentication token for the last record is the same as that present in the Writer's Secure Store. If yes, process 96 declares that the integrity of the entire audit trail (as well as the DB 10) is intact. If no, process 88 declares that the audit trail of the DB 10 has been tampered. The above described validation process can be done at any time when an independent auditor decides to check the integrity of the DB 10.

As it is known, an audit trail can usually be tampered with in five different ways:
1. deletion of the whole audit trail;
2. deletion of N records in the middle of the audit trail;
3. deletion of N records from the end of the audit trail;
4. addition of invalid records to the audit trail; or
5. modification of one or more records in the audit trail.

The present invention can successfully and efficiently deal with all the above listed possible ways of tampering. For example, since the data for the first record is stored in the Secure Store with the Timestamp and the PRN, and the DBA doesn't have an access to it, therefore he can not replace the whole audit trail with an invalid one without being detected.

Assuming for the purpose of illustration that the DBA deletes N records $R_{i+1}$ to $R_{i+N}$, thus the last validatable record is record $R_i$. The next record should have authentication token and validation token calculated as follows according to one example of the present invention:

Authentication token $A_{i+1} = H(V_i + A_i)$

Validation token $V_{i+1} = H(E_{Ai+1}\{D_i\} + A_{i+1})$.

However, the next validation token found in the SS 22 in not $V_{i+1}$, but $V_{i+N+1}$ originally for record $R_{i+N+1}$, where $$V_{i+N+1} = H(E_{Ai+N+1}\{D_{i+N+1}\} + A_{i+N+1}).$$

Assuming the cryptography technology used in the encryption process is strong enough, $V_{i+N+1}$ should be different from $V_{i+1}$ and a mismatch will be detected easily.

Assuming that the DBA deletes N records from the end of the trail (e.g., from $R_{i-N}$ to $R_i$ wherein $R_i$ being the last record listed in the audit trail). This action, whether authorized or not, can be detected. The authentication token generated at the end of the trail is now:

$$A_{i-N}=H(V_{i-N-1}+A_i),$$

however the token saved in the Secure Store is $$A_i==H(V_{i-1}+A_{i-1}).$$

These two authentication token will differ in their values, and hence a modification of the trail has been indicated.

Moreover, it is desirable to detect any addition of the records to the audit trail by the DBA. For example, since the validation token for a record $R_i$ is generated in one example of the present invention by the following mechanism:

$$V_i=H(A_i+E_{Ai}\{D_i\})$$

and as the DBA doesn't have an access to $A_i$ he cannot generate a valid validation token for the new record added by him. Any additions can be detected immediately.

Similarly, for modification of the record listed in the trail, since the DBA doesn't have access to any authentication token, he cannot generate a valid validation token for a record modified by him. Consequently, any modification can also be detected.

In the above described examples of the present invention, it is assumed that the Writer is a secure writing machine which has a secure storage not accessible by any user other than the auditor who has a reading access. At a very minimum, even when an event happens that breaks the security, it is guaranteed that all records written before the event will be protected from tampering. This is because only the last authentication token is available to the attacker and obtaining the previous authentication tokens is computationally infeasible as it involves breaking the hash function.

Figure 6:
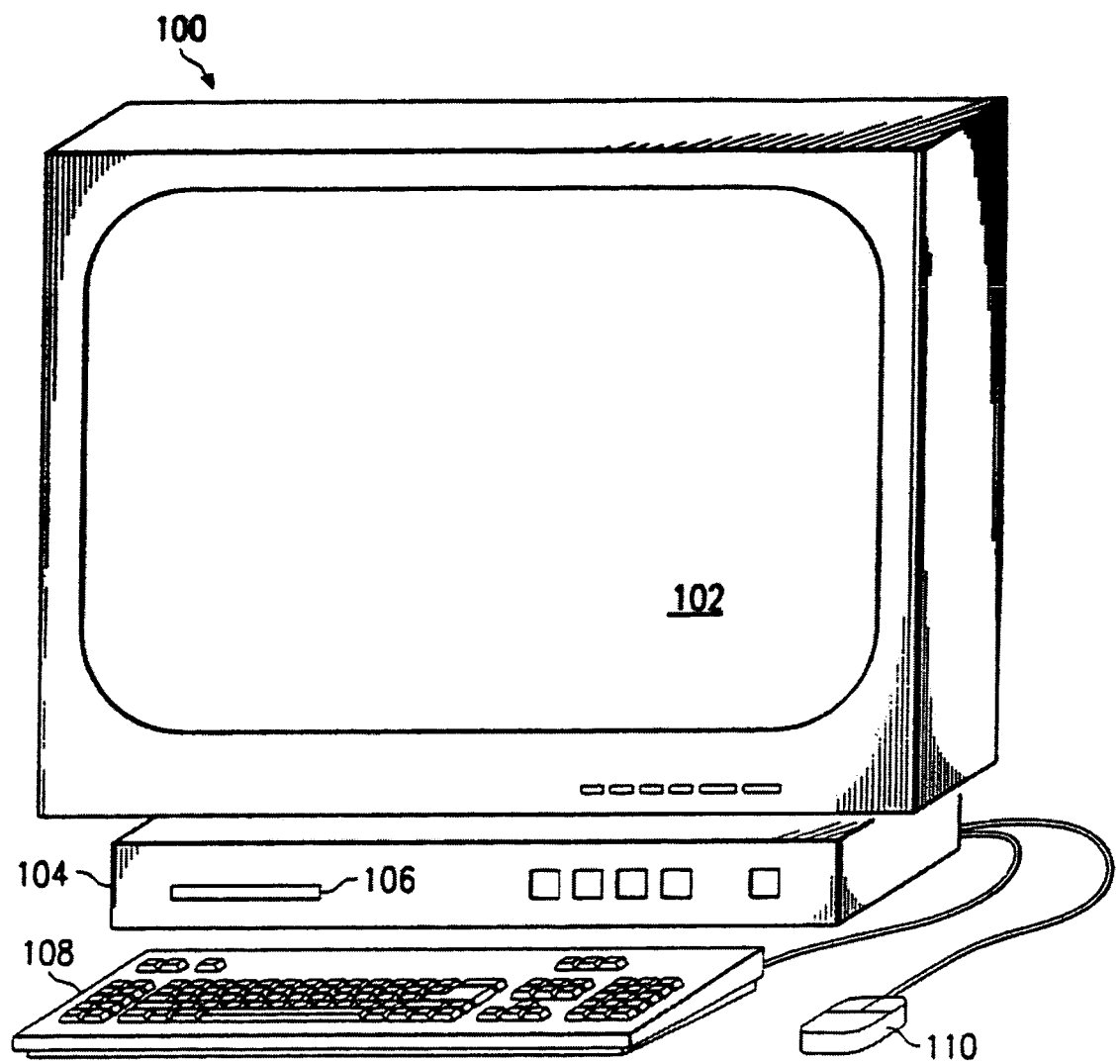
FIG. 6 illustrates a computer system for implementing the present invention.

Referring now to FIG. 6, a computer system 100 includes a two-dimensional graphical display (also referred to as a "screen") 102 and a central processing unit 104. The central processing unit 104 contains a microprocessor and random access memory for storing programs. A disk drive 106 for loading programs may also be provided. A keyboard 108 having a plurality of keys thereon is connected to the central processing unit 104, and a pointing device such as a mouse 110 is also connected to the central processing unit 104. It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software.

The present invention as described above thus provides an improved method for providing a tamper-proof storage of an audit trail in a database. Various benefits are achieved over conventional approaches. For instance, the security of the entire database is strengthened, while normal database queries are not hindered. Further, any actions taken against the records in the audit trail can be detected without involving a computationally expensive process.

The above disclosure provides many different embodiments, or examples, for implementing different features of the invention. Specific examples of components, and processes are described to help clarify the invention. These are, of course, merely examples and are not intended to limit the invention from that described in the claims. For example, various acceptable encryption algorithms can be conceivably used in conjunction with various examples of the present invention. Similarly, hashing algorithms can also be varied by one skilled in the art.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for providing a tamper-proof storage of an audit trail having one or more records for a database system, the integrity of the audit trail being vulnerable to actions taken by an access-privileged user, the method comprising:
   creating an initial authentication token and initial validation token for the audit trail from a Pseudo Random Number, a Timestamp, and a preliminary authentication token;
   saving the initial authentication token as a current authentication token in a predetermined format in a secured information storage;
   generating one or more validation tokens and authentication tokens sequentially from the initial authentication token and the initial validation token through a combination of at least one hashing process and at least one encryption process;
   integrating the generated validation tokens in the records of the audit trail by a writing machine which is decoupled from the database and inaccessible by the user; and
   validating, by an authorized auditor, the records of the audit trail by using the generated validation tokens in order to detect a tampering of the audit trail,
   wherein a writing and reading access to the secured information storage is given to the writing machine and only a reading access is given to the auditor, and wherein the Pseudo Random Number, the Timestamp, and the preliminary authentication token are saved in the secured information storage.

2. The method of claim 1 further comprising installing an initial record of the audit trail by the auditor.

3. The method of claim 2 wherein the initial record of the audit trail has null content.

4. The method of claim 1 wherein the step of creating further includes:
   creating the initial validation token from the Pseudo Random Number, the Timestamp, and the preliminary authentication token by the auditor;
   creating the initial authentication token through a hashing process after concatenating the preliminary authentication token with the initial validation token; and
   integrating the initial validation token to the initial record of the audit trail.

5. The method of claim 1 wherein the step of generating further includes:
   creating the validation token for a selected record by encrypting the selected record with the then current authentication token saved in the secured information storage; and
   updating the value of the current authentication token by generating the authentication token through a hashing process after concatenating the created validation token with the then current authentication token saved in the secured information storage, wherein the above steps are conducted repeatedly for various records in the audit trail, and wherein any prior value of the current authentication token saved in the secured information storage is irreversibly deleted when an updated value is obtained.

6. The method of claim 1 wherein the step of generating further includes:
   creating a validation token for a selected record by concatenating, hashing, and encrypting the selected record with the saved authentication token; and
   updating the value of the current authentication token by generating the authentication token further through encrypting the created validation token,
   wherein the above steps are conducted repeatedly for various records in the audit trail, and wherein any prior value of the current authentication token saved in the secured information storage is irreversibly deleted when an updated value is obtained.

7. The method of claim 1 wherein the step of integrating further includes adding a predetermined field to the record.

8. The method of claim 1 wherein the step of validating further includes:
   obtaining the saved Pseudo Random Number, Timestamp, and preliminary authentication token from the secured information storage;
   computing sequentially the validation tokens for the records of the database based on the obtained Pseudo Random Number, Timestamp, and selected preliminary authentication token;
   comparing each computed validation token with the integrated validation token in the record,
   wherein a tampering of the record is detected if the computed validation token is different from the integrated validation token in the record.

9. A computer program for providing a tamper-proof storage of an audit trail having one or more records for a database, the integrity of the trail being vulnerable to actions taken by an access-privileged user, the program comprising:
   program means for creating an initial authentication token and initial validation token of the audit trail from a Pseudo Random Number, a Timestamp, and a preliminary authentication token;
   program means for saving the initial authentication token as a current authentication token in a predetermined format in a secured information storage;
   program means for generating one or more validation tokens and authentication tokens sequentially from the initial authentication token and the initial validation token through a combination of at least one hashing process and at least one encryption process;
   program means for integrating the generated validation tokens in the records of the audit trail by a writing machine which is decoupled from the database and inaccessible by the user; and
   program means for validating, by an authorized auditor, the records of the audit trail by using the generated validation tokens in order to detect a tampering of the audit trail,
   wherein a writing and reading access to the secured information storage is given to the writing machine and only a reading access is given to the auditor, and wherein the Pseudo Random Number, the Timestamp, and the preliminary authentication token are saved in the secured information storage.

10. The program of claim 9 further comprising program means for installing an initial record of the audit trail by the auditor.

11. The program of claim 10 wherein the initial record of the audit trail has null content.

12. The program of claim 9 wherein the program means for creating further includes:
   program means for creating the initial validation token from the Pseudo Random Number, the Timestamp, and the preliminary authentication token by the auditor;
   program means for creating the initial authentication token through a hashing process after concatenating the preliminary authentication token with the initial validation token; and
   program means for integrating the initial validation token to the initial record of the audit trail.

13. The program of claim 9 wherein the program means for generating further includes:
   program means for creating the validation token for a selected record by encrypting the selected record with the then current authentication token saved in the secured information storage; and
   program means for updating the value of the current authentication token by generating the authentication token through a hashing process after concatenating the created validation token with the then current authentication token saved in the secured information storage,
   wherein the above steps are conducted repeatedly for various records in the audit trail, and wherein any prior value of the current authentication token saved in the secured information storage is irreversibly deleted when an updated value is obtained.

14. The program of claim 9 wherein the program means for generating further includes:
   program means for creating a validation token for a selected record by concatenating, hashing, and encrypting the selected record with the saved authentication token; and
   program means for updating the value of the current authentication token by generating the authentication token further through encrypting the created validation token, wherein the above steps are conducted repeatedly for various records in the audit trail, and
   wherein any prior value of the current authentication token saved in the secured information storage is irreversibly deleted when an updated value is obtained.

15. The program of claim 9 wherein the program means for integrating further includes program means for adding a predetermined field to the record.

16. The program of claim 9 wherein the program means for validating further includes:
   program means for obtaining the saved Pseudo Random Number, Timestamp, and preliminary authentication token from the secured information storage;
   program means for computing sequentially the validation tokens for the records of the audit trail based on the obtained Pseudo Random Number, Timestamp, and selected preliminary authentication token; and
   program means for comparing each computed validation token with the integrated validation token in the record,
   wherein a tampering of the record is detected if the computed validation token is different from the integrated validation token in the record.

17. A computer system for providing a tamper-proof storage of an audit trail having one or more records for a database, the integrity of the trail being vulnerable to actions taken by an access-privileged user, the system comprising:

means for creating an initial authentication token and initial validation token of the audit trail from a Pseudo Random Number, a Timestamp, and a preliminary authentication token;

a secured information storage means for saving the initial authentication token as a current authentication token in a predetermined format;

means for generating one or more validation tokens and authentication tokens sequentially from the initial authentication token and the initial validation token through a combination of at least one hashing process and at least one encryption process;

means for integrating the generated validation tokens in the records of the audit trail; and means for validating, by an authorized auditor, the records of the audit trail by using the generated validation tokens in order to detect a tampering of the audit trail, wherein the secured information storage is inaccessible by the user but accessible by the auditor, a writing and reading access to the secured information storage is only given to a writing machine which is decoupled from the database and inaccessible by the user, and wherein the Pseudo Random Number, the Timestamp, and the preliminary authentication token are saved in the secured information storage.

* * * * *